No. 618,048. Patented Jan. 24, 1899.
W. A. ANDERSON.
DETACHABLE HOLDER FOR DUST PANS.
(Application filed Feb. 8, 1898.)
(No Model.)
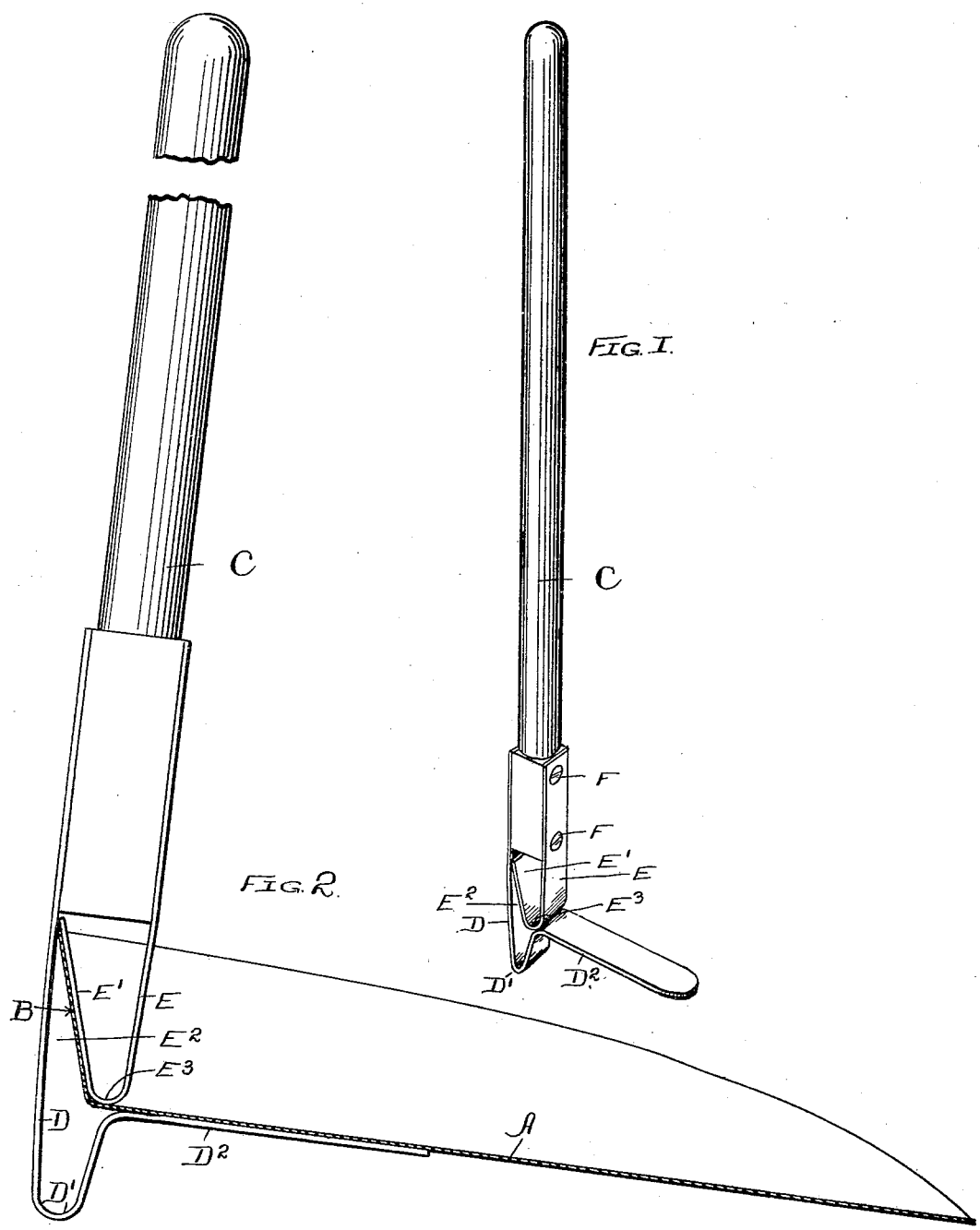
WITNESSES:
INVENTOR:
Wendell A. Anderson,
BY Munday, Evarts & Adcock.
HIS ATTORNEYS.

UNITED STATES PATENT OFFICE.

WENDELL A. ANDERSON, OF LA CROSSE, WISCONSIN.

DETACHABLE HOLDER FOR DUST-PANS.

SPECIFICATION forming part of Letters Patent No. 618,048, dated January 24, 1899.

Application filed February 8, 1898. Serial No. 669,498. (No model.)

*To all whom it may concern:*

Be it known that I, WENDELL A. ANDERSON, a citizen of the United States, residing in La Crosse, in the county of La Crosse and State of Wisconsin, have invented a new and useful Improvement in Detachable Holders for Dust-Pans, of which the following is a specification.

This invention relates to devices whereby the housewife or maid may without stooping or inclining her body be able to position and move the ordinary dust-pan while in use as occasion requires.

The invention is only temporarily attached to the pan, and consequently is adapted to be used with dust-pans of the ordinary short-handled construction.

It consists of a handle of proper length to enable it to be held in the hand without stooping or bending over and provided with means whereby it may be readily attached to dust-pans of the ordinary construction, these attaching means consisting of a plate of spring metal projecting down from the handle and bent below the handle to form a heel adapted to raise the rear end of the pan and also to form a toe extending under and supporting the pan and a second strip of like metal also attached to the handle and extending down close to the level of the toe and thence doubled inward upon itself, with its free end standing over against the other strip and forming with the latter a recess in which the upstanding rim of the pan may be entered and wherein it will be held against movement.

The nature of my invention will be better understood from the accompanying drawings, forming a part of this specification, and in which—

Figure 1 is a perspective of my detachable handle; and Fig. 2 shows a pan and a handle applied thereto ready for use, the pan being shown in section.

In said drawings, A represents the bottom, and B the rim, of an ordinary dust-pan, which may or may not be provided with the permanent short handle customarily used upon such pans. To this dust-pan I temporarily attach my improved handle C whenever the pan is to be used, and to enable this attachment to be made quickly and easily and also to enable the equally quick and easy removal of the handle I provide the latter with the following devices:

D and E are strips of spring-like metal attached to the bottom of the handle by screws or rivets F. The strip D is extended straight downward some distance below the handle, so as to form the heel D', and is then bent upward and forward, so as to form the toe $D^2$, as shown. The toe passes under the bottom of the pan and supports it, while the heel serves to raise the back of the pan sufficiently above the floor to give the pan the desired pitch and to insure close contact by the front of the pan with the floor. The strip E, similarly secured to the handle, extends straight down from the handle into proximity to the level of the toe $D^2$ and is then reversed or doubled toward strip D, with its free end E' inclining over against the latter. There is thus formed between the strips D and E a vertical space $E^2$, into which the back rim B of the dust-pan will be entered and wherein the rim will be clamped between the strip D and the end E' of strip E. The bend $E^3$ of strip E also holds the bottom of the pan down on the toe $D^2$. Ordinarily this clamping action will be sufficient to prevent any movement of the pan within the holding devices; but if there should be some slight movement it will not be objectionable.

The handle C should be of sufficient length to extend from the floor to within easy reach of the user while she is standing erect.

I prefer to use flat spring metal for the attaching devices, as thereby I avoid the necessity of duplicating them, so as to adapt them to take hold of the pan at separated points.

The device is adapted to be applied to any part of the rim at the back of the pan and admits of considerable variation in the height of the rim.

It is desirable to construct the holder so it will stand upright when attached to the pan, even if the user should release her hold upon it, because if not thus constructed it might tip over and spill out the accumulated sweepings should the user let go the handle. For this purpose I incline the handle slightly forward, as shown, so as to throw its center of gravity over the pan, and I find that this forward inclination of the handle is useful also in manipulating the pan, because it facilitates the proper positioning of the pan when sweeping into it.

I claim—

1. The dust-pan holder consisting of a handle C and two flat metal strips, one strip extending behind and under the pan, and the other extending down in front of the rim and having its end E' inclined so as to clamp the rim, substantially as specified.

2. The dust-pan holder consisting of a handle C and two metal strips, one strip extending behind and under the pan, and the other extending down in front of the rim and bearing upon the bottom of the pan, the space between the vertical parts of the strips being adapted to receive rims of different heights, substantially as specified.

WENDELL A. ANDERSON.

Witnesses:
F. D. CARLETON,
S. W. BROWN.